United States Patent
Krawinkel

(10) Patent No.: US 8,932,396 B2
(45) Date of Patent: Jan. 13, 2015

(54) SOLUTION, IN PARTICULAR FOR PRETREATING A HYDROPHILIC SUBSURFACE IN ORDER TO IMPROVE AN ADHESIVE BOND UNDER HUMID AND WET CONDITIONS

(75) Inventor: Thorsten Krawinkel, Hamburg (DE)

(73) Assignee: Tesa SE, Hamburg (DE)

( * ) Notice: Subject to any disclaimer, the term of this patent is extended or adjusted under 35 U.S.C. 154(b) by 518 days.

(21) Appl. No.: 13/148,109

(22) PCT Filed: Jan. 22, 2010

(86) PCT No.: PCT/EP2010/050717
§ 371 (c)(1),
(2), (4) Date: Sep. 13, 2011

(87) PCT Pub. No.: WO2010/089205
PCT Pub. Date: Aug. 12, 2010

(65) Prior Publication Data
US 2011/0315048 A1    Dec. 29, 2011

(30) Foreign Application Priority Data
Feb. 6, 2009 (DE) .......................... 10 2009 007 930

(51) Int. Cl.
C09J 5/02 (2006.01)
C09K 3/18 (2006.01)
(52) U.S. Cl.
CPC ... C09J 5/02 (2013.01); C09K 3/18 (2013.01); C09J 2483/003 (2013.01)
USPC ............ 106/287.11; 106/287.12; 106/287.13; 106/287.15
(58) Field of Classification Search
CPC ........ C09J 5/02; C09J 2483/003; C09K 3/18; C09D 183/04
USPC ............. 106/287.11, 287.12, 287.13, 187.15, 106/287.14
See application file for complete search history.

(56) References Cited

U.S. PATENT DOCUMENTS

| 4,024,312 A | 5/1977 | Korpman |
| 4,344,763 A | 8/1982 | Tolgyesi et al. |
| 5,178,675 A * | 1/1993 | Sexsmith ................. 106/287.11 |
| 6,284,378 B1 | 9/2001 | Junghans et al. |
| 8,808,446 B2 * | 8/2014 | Konno et al. ............ 106/287.12 |
| 2002/0018889 A1 | 2/2002 | Franck et al. |
| 2006/0251908 A1 * | 11/2006 | Fukasawa et al. ............ 428/448 |

FOREIGN PATENT DOCUMENTS

| DE | 102007030196 A1 | 5/2008 |
| EP | 0577014 A1 | 1/1994 |
| EP | 0819663 A1 | 1/1998 |
| WO | 9211332 A1 | 7/1992 |
| WO | 9211333 A1 | 7/1992 |
| WO | 9506691 A1 | 3/1995 |
| WO | 9937729 A1 | 7/1999 |
| WO | 9946324 A1 | 9/1999 |
| WO | 2005040296 A1 | 5/2005 |

* cited by examiner

Primary Examiner — David M Brunsman
(74) Attorney, Agent, or Firm — Norris McLaughlin & Marcus PA

(57) ABSTRACT

The invention relates to a solution, in particular for pretreating a hydrophilic surface for hydrophobization, comprising: I. at least one silane of the formula (1) where $R^1$, $R^2$, $R^3$ independently of one another are selected from the group consisting of methyl, ethyl, 2-methoxyethyl, propyl and i-propyl, butyl, benzyl m=0 or 1, n=3 to 12, p=1 or 2, and, for p=1, Y=a functional group selected from the group consisting of (meth)alkyl, (meth)acryloxy, mercapto, ureido, —NH—CH2—CH2-$NR^4R^5$ and —$NR^4R^5$ (where $R^4$ and $R^5$ independently of one another are selected from the group consisting of H, alkyl, phenyl, benzyl, cycloalkyl), or, for p=2, Y=NH; and II. at least one second silane increasing the aging stability having no more than two carbon atoms bound to the silicon in a chain.

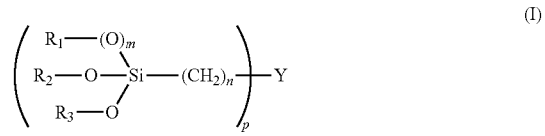

(I)

10 Claims, No Drawings

SOLUTION, IN PARTICULAR FOR PRETREATING A HYDROPHILIC SUBSURFACE IN ORDER TO IMPROVE AN ADHESIVE BOND UNDER HUMID AND WET CONDITIONS

This application is a 371 of PCT/EP2010/050717, filed Jan. 22, 2010, which claims foreign priority benefit under 35 U.S.C. §119 of the German Patent Application No. 10 2009 007 930.0 filed Feb. 6, 2009, the disclosures of which are incorporated herein by reference.

The invention relates to a solution and to its use for pretreating a hydrophilic substrate such as glass for the purpose of improving the adhesion of a bonding agent to said substrate under humid and wet conditions.

The adhesive bonding of lightweight articles in the household is frequently carried out using adhesive tapes, hotmelt adhesives or reactive adhesives. Since the holding power is increased on solid substrates relative to cleavable substrates, bonding takes place, if possible, to metal, ceramic tiles or glass. Besides their use in the household, bonding agents are also used for bonding glass, metal, etc. in industrial production.

A feature common to ceramic and glass surfaces is that they can be classed as being hydrophilic. A property of hydrophilic substrates is the capacity often to have a surface-bound, very thin layer of adsorbed water, which can be removed only at very high temperatures. This layer has the capacity, particularly at high atmospheric humidity or on exposure to water, to accommodate further water and so to impair the bonding performance, up to the point of complete failure of the bond.

The reaction of adhesives can be inhibited by humidity if these adhesives are required to form a covalent bond to the surface in order to fulfill their function.

Pressure-sensitive adhesives (PSAs) are frequently based on acrylates, natural rubber or styrene block copolymers. PSAs for double-sided adhesive tapes in particular are usually composed of acrylates or styrene block copolymers, the holding power frequently being somewhat lower for the acrylates. Under humid conditions specifically, they exhibit precisely the opposite behavior: acrylate PSAs are significantly less susceptible to wetness and humidity than block copolymer compositions.

The construction of the adhesive tapes also contributes to their sensitivity to humidity: hard adhesives and adhesive tapes with rigid carriers are frequently more susceptible than those having very flexible carriers. Double-sided adhesive tapes with intermediate foam carriers, in particular, react sensitively to humidity when they are bonded to hydrophilic substrates.

Hotmelt adhesives are composed of styrene block copolymers or of ethylene-vinyl acetate. Both kinds of hotmelt adhesive are susceptible to humidity.

Industrial solutions for the problem of deficient adhesion substrates are known. For instance, prior to bonding, glasses are coated with adhesion promoters which hydrophobize the surface and hence eliminate the aforementioned layer of water. The hydrophobization is carried out using organosilanes. The most frequently employed in this context are those of the general formula

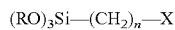

with
R=$CH_3$ or $C_2H_5$,
n=3 to 12, and
a functional group X.

Following the application of the silane to the hydrophilic surface, a covalent bond is formed between surface and silane. If the surface has been completely silanized, the film of water described above is removed and can also not be formed again, and so the water is no longer able to run behind the bond.

There are silanes which react with adhesive and surface, and silanes which hydrophobize only the surface, in order to facilitate subsequent bonding and strengthen the adhesive bond. The use of such a silane is described, for example, in WO 2005/040296 A1, in which a silane is applied to a pressure-sensitive adhesive prior to bonding. After bonding it is necessary to wait for at least 24 hours until the ultimate bond strength is reached.

Moreover, these silanes can be subdivided into reactive silanes and moderately reactive silanes. Reactive silanes lead within a few minutes to effective hydrophobization of a surface, an effect which with moderately reactive silanes is achieved only after hours. The advantage of moderately reactive silanes, however, is their long shelf life of more than six months in solution. The group of the reactive silanes includes, for example, γ-aminopropyltriethoxysilane. In contrast, 3-glycidyloxypropyltrimethoxysilane is classed as moderately reactive.

WO 2005/040296 A1, then, shows the application of a solution of 3-glycidyloxypropyltrimethoxysilane for improving the bonding of acrylate adhesives to glass surfaces. In that application the contact between adhesive and surface is produced before the solvent has evaporated, in order to achieve a covalent attachment of the silane both to the glass surface and to the adhesive. After contact has been produced, it is necessary to wait 72 hours before the bond can be subjected to any loading. The approach set out in WO 2005/040296 A1 is acceptable if it is possible to observe the waiting time of 72 hours. In many cases, however, this waiting time leads to delay in the production process. If, furthermore, the pretreatment of the surface is to be undertaken by the end user, in the case of private applications, a shortening of the waiting time is an absolute necessity. The use of a reactive silane such as, for example, γ-aminopropyltriethoxysilane, which is described in DE 198 13 081 A1, does not provide a solution to the problem either, though, since there the shelf life is too short. Consumer products, for example, are frequently in the stockroom, or at the customers premises, for quite some time before being employed. Storage times of two years between production and use are not uncommon.

A first improvement to the shelf life was disclosed with a solution intended more particularly for pretreating a hydrophilic surface for the purpose of hydrophobizing, as disclosed in WO 2008/052887 A1. The solution comprises a silane of the formula

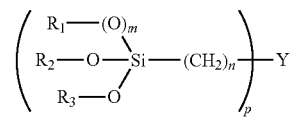

with
$R_1$, $R_2$, and $R_3$ independently of one another selected from the group consisting of methyl, ethyl, 2-methoxyethyl, and isopropyl
m=0 or 1
n=0 to 12
p=1 or 2
and if p=1

Y=a functional group selected from the group consisting of alkyl, vinyl, phenyl, cyclobutyl, cyclopentyl, cyclohexyl, glycidyl, glycidyloxy, isocyanato, ureido, —CF$_3$, —(CF$_2$)$_q$CF$_3$ with q=1 to 12, cyanide, halide, (meth) acryloyl, (meth)acryloyloxy, —NH—CH$_2$—CH$_2$—NR$^4$R$^5$, —NR$^4$R$^5$ (with R$^4$ and R$^5$ independently of one another selected from the group consisting of H, alkyl, phenyl, benzyl, cyclopentyl, and cyclohexyl)

or if p=2

Y=O, S, NH and also comprising a component whose effect is that the pH range of the one hydrophilic surface deviates by at least two units from the neutral range.

It is an object of the invention to achieve a significant increase in the shelf life of a highly reactive—that is, very quickly reacting—silane, so that the product can be used for longer.

This object is achieved by means of a solution as set out in the main claim. The dependent claims provide advantageous developments of the subject matter of the invention. The invention further relates to uses of the solution of the invention, and also to a set comprising the solution of the invention and an adhesive sheet.

The invention accordingly provides a solution particularly for the pretreatment of a hydrophilic surface for hydrophobizing, consisting of I. at least one silane of the formula

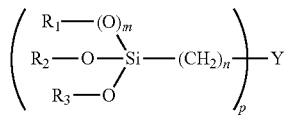

with

R$^1$, R$^2$, R$^3$ independently of one another selected from the group of methyl, ethyl, 2-hydroxyethyl, propyl, isopropyl, butyl, benzyl m=0 or 1 n=3 to 12 p=1 or 2 and for p=1

Y=a functional group selected from the group of (meth) acryloyl, (meth)acryloyloxy, mercapto, ureido, —N—CH$_2$—CH$_2$—NR$^4$R$^5$, —NR$^4$R$^5$ (with R$^4$ and R$^5$ independently of one another selected from the group of H, alkyl, phenyl, benzyl, cycloalkyl), or for p=2

Y=NH and

II. at least one second, aging stability enhancing silane having not more than two carbon atoms in chain attached to the silicon atom.

In accordance with one advantageous embodiment of the invention, the silanes are in solution in a nonprotic solvent or in a solvent mixture in which a nonprotic solvent is present at not less than 30% by weight.

The second silane is selected individually or in any desired combination preferably from the group of II.a) a silane of the formula

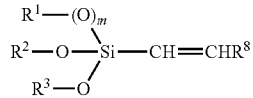

with

R$^8$=H, alkyl, phenyl, benzyl or cycloalkyl (hence there are two carbon atoms in chain attached to the silicon atom, i.e., "n=2")

and/or b) a silane having the formula

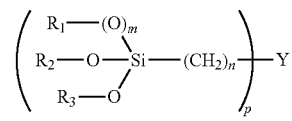

with

R$^1$, R$^2$, R$^3$ independently of one another selected from the group of methyl, ethyl, 2-methoxyethyl, propyl, isopropyl, butyl, benzyl m=0 or 1 n=1 p=1

Y=NHR$_6$, OR$^6$, SR$^6$ (with R$^6$=H, alkyl, phenyl, benzyl, C(X$^1$)—X$^2$—R$^7$, C(X$^1$)—R$^7$ with X$^1$ and X$^2$ independently of one another=O or S and R$^7$=alkyl, phenyl or cycloalkyl)

(hence there is one carbon atom in chain attached to the silicon atom, i.e., "n=1")

and/or c) a silane of the formula

Si(OR$^9$)$_4$ with R$^9$=methyl, ethyl, n-propyl, isopropyl, butyl, isobutyl, benzyl, phenyl (hence there is no carbon atom in chain attached to the silicon atom, i.e., "n=1").

With further preference, the solution of the invention has a concentration of in each case 0.01% to 8% by weight of the silanes in total, preferably 0.1% to 6% by weight, more preferably 0.5% to 5% by weight.

With further preference the boiling point of the solvent or the solvent mixture is between 35 and 180° C., in order to allow very rapid evaporation after the solution has been applied to the surface.

It is further advantageous if, when the solution of the invention is applied, there is no need for special protective measures such as gloves, which is why very largely unhazardous solvents are preferably employed, such as carboxylic esters or ketones, for example. Particularly preferred are ethyl acetate or butyl acetate.

Examples of silanes of group I are, for example, Dynasylan DAMO, Dynasylan 1122, Dynasylan 1189, Dynasylan AMEO, and Dynasylan MEMO from Evonik. Silanes of group IIa are, for example, Dynasylan VTEO, VTMO or VTMOEO from Evonik. Silanes of group IIb can be obtained, for example, from Wacker under the names Geniosil XL924, 926 or 973. The silanes of group IIc are available, for example, as Dynasylan A, M or P from Evonik.

The ratio of the silanes of group I to the silanes of group II may fluctuate between 1:10 and 10:1 weight fractions; preferably the ratio is from 2:1 to 1:4, more preferably between 1:1 and 1:3.

Also particularly advantageous are mixtures of silanes from 1 with IIa and IIc.

For the silanes of group II, a mixture of the silanes IIa and IIc is preferred. With further preference, the ratio between IIa and IIc in this case is 1:2 to 4:1, more preferably 1:1 to 2:1.

The mode of function of the solution of the invention can be elucidated by the example of the reaction of silanes with a glass surface. The reaction of the silanes with the glass surface takes place in two steps. First, the silanes must be hydrolyzed—that is, the alcoholic groups RO are eliminated and replaced by hydroxyl groups. The resulting Si—OH (silanol) groups then react first with themselves and second with the OH groups of the glass surface, producing a covalent bond. When the glass surface is completely silanized, the water film described above is removed and can also no longer be formed, and, consequently, the water is no longer able to run behind the bond.

Surprisingly simply and, for the skilled person, entirely unexpectedly, the stated object, that of enhancing the aging stability of a silane, is solved by a mixture prepared with a second silane.

The presentation form of the solution of the invention is critically important particularly for application in the private sector by the end user. Preference is given here to dispensing in bottles, tubes or cans, as a pump spray or an aerosol, for example, or to dispensing in sealed-edge pouches containing a nonwoven or woven material or a sponge. A sealed-edge pouch of this kind is composed of a solvent-impermeable and water-impermeable foil, such as a PE/Al/PET composite, for example. This foil can be welded under the action of heat. Within the resultant pouch there is a cloth, ideally a nonwoven material, which is impregnated with the adhesion promoter solution, composed at least of the two silanes and solvent. For application, the end user can tear open the pouch, take out the impregnated cloth, and use it to pretreat his or her ceramic substrate or tile or the glass to which bonding is to take place.

Another preferred presentation form entails dispensing into containers containing a reservoir and an applicator. In this case the silane solution is applied by contacting the surface with the applicator.

Especially preferred are packs where the user is quite simply unable to come into contact with the solutions even during use.

For example, a nonwoven material or a sponge may be integrated into a pack in such a way that they are located on the free surface of the pack. Additionally located in the pack is the solution, which is separate from the nonwoven material or sponge as a result of a severable membrane, or which is enclosed by an envelope and in this way separate from the nonwoven material or sponge.

After the membrane has been severed or the envelope destroyed by pressure exerted by the user on the pack, the nonwoven material is wetted by the solution being supplied through an appropriately shaped channel to the nonwoven material or the sponge. The solution penetrates the exposed nonwoven material or the sponge and can be contacted therewith the hydrophilic surface, without the user touching the nonwoven material or the sponge.

Optimally the reaction on the surface then takes place within a few minutes, so that subsequently the bonding operation and also the loading of the bond can take place.

Adhesive tapes which can be used preferably in combination with the invention are highly elastic adhesive sheets for redetachable bonds which are redetachable by pulling in the direction of the bond plane. These adhesive sheets are available commercially from tesa AG under the names "tesa Powerstrips"® and "tesa Posterstrips"® and "tesa Powerstrips System-Haken"®, a so-called system hook with base plate and attachable decorative hook. Furthermore, 3M, under the "Command Adhesive" name, offers similar adhesive sheets, also partable by pulling, which are composed of an intermediate foam carrier on which adhesives are applied on both sides.

Elastically or plastically highly extensible pressure-sensitive adhesive strips which can be redetached without residue and destruction by extensive stretching in the bond plane are known, furthermore, for example, from U.S. Pat. No. 4,024,312 A, DE 33 31 016 C2, WO 92/11332 A1, WO 92/11333 A1, DE 42 22 849 A1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 854 A1, WO 99/37729 A1, and DE 100 03 318 A.

Test Methods

In contrast to the customary testing for the water resistance of a bond, particularly in the area of pressure-sensitive adhesives and adhesive tapes, no peel test is carried out before and after water storage, since in this case the bond is not under load, and so it is much more difficult for the water to penetrate the joint.

Instead, a hook of a certain size is bonded and is loaded with a defined weight. The bond is then stored at 35° C. and 85% relative humidity, and is sprinkled with water at intervals of 24 hours, and the holding time in hours is recorded. As a control, a bond without adhesion promoter solution is carried out as well.

The examples below are intended to illustrate the invention, without any intention that it should be restricted.

EXAMPLES

Preparation of Adhesion Promoters

Comparative Example 1

1 g of γ-amionpropyltriethoxy silane (Dynasylan AMEO) is dissolved in 99 g of ethanol (anhydrous). 1 ml of this solution is placed together with a nonwoven PP material with an area of 6×12 cm into an aluminum-coated sealed-edge pouch, which is welded.

Comparative Example 2

1 g of γ-amionpropyltriethoxy silane (Dynasylan AMEO) is dissolved in 99 g of butyl acetate. 1 ml of this solution is placed together with a nonwoven PP material with an area of 6×12 cm into an aluminum-coated sealed-edge pouch, which is welded.

Example 3

1 g of γ-amionpropyltriethoxy silane (Dynasylan AMEO) and 2 g of vinyltrimethoxysilane (Dynasilan VTMO) are dissolved in 97 g of butyl acetate. 1 ml of this solution is placed together with a nonwoven PP material with an area of 6×12 cm into an aluminum-coated sealed-edge pouch, which is welded.

Example 4

1 g of Dynasylan AMMO, 2 g of Dynasylan VTMO, and 1 g of tetraethyl orthosilicate from Aldrich are dissolved in a mixture of 46 g of ethanol and 50 g of ethyl acetate. 1 ml of this solution is placed together with a nonwoven PP material with an area of 6×12 cm into an aluminum-coated sealed-edge pouch, which is welded.

Example 5

1 g of Dynasylan MEMO and 2 g of Geniosil XL 926 ((N-cyclohexylaminomethyl)triexoxy-silane) are dissolved in 97 g of ethyl acetate. 1 ml of this solution is placed together with a nonwoven PP material with an area of 6×12 cm into an aluminum-coated sealed-edge pouch, which is welded.

To investigate the solutions, two pouches of each solution are opened, and a ceramic tile with a smooth glaze is brushed with each impregnated nonwoven material. After a waiting time of 15 minutes, on the one hand, a double-sided acrylate tab, Tesa® 4952 (a double-sided adhesive tape with a foam carrier and an aging-resistant acrylate adhesive, with a thickness of 1.2 mm and a bond strength to steel of 14 N/25 mm), in a size of 50 mm×19 mm, and, on the other hand, three Powerstrips® Large from tesa (double-sidedly adhesive, carrierless, individually enveloped diecuts with an adhesive based on synthetic rubber, with a thickness of 0.65 mm and a bond strength to steel of 74.0 N/25 mm), are adhered to the pretreated tile. These systems are described extensively in DE 33 31 016 C2, DE 42 22 849 A1, DE 42 33 872 A1, DE 44 31 914 A1, DE 195 37 323 A1, DE 197 08 364 A1, DE 197 29 706, and DE 100 33 399 A1.

Adhered to the bonding agents, with a pressure of 100 N, is a cleaned steel baseplate whose construction is such that it is possible to mount a hook body with a vertically protruding metal rod. The tiles are fixed vertically, and at a distance of 50 mm a weight of 200 g in the case of the acrylate tab and 1 kg in the case of the Powerstrip is suspended from the hook. After a waiting time of 10 minutes, water (2 ml) is trickled from above onto the bond. This wetting is repeated every 24 hours. A measurement is made of the time in hours after which the hook falls from the wall. As a comparison, hooks without adhesion promoter are suspended.

This experiment is carried out with fresh samples and stored pouches (3 months at 40° C.). The results can be seen from table 1.

TABLE 1

| | Comparative example 1 | Comparative example 2 | Example 3 | Example 4 | Example 5 | Without adhesion promoter |
|---|---|---|---|---|---|---|
| Fresh solution Acrylate tab | >500 h | >500 h | >500 h | >500 h | >500 h | 1 h |
| Fresh solution Powerstrips | >500 h | >500 h | >500 h | >500 h | >500 h | <1 h |
| Stored solution Acrylate tab | 2 h | 5 h | >500 h | >500 h | >500 h | |
| Stored solution Powerstrips | <1 h | 3 h | >500 h | >500 h | >500 h | |

It is evident that only with a suitable combination, obtained in accordance with the invention, of at least two silanes, as described above, is the storage stability good.

The invention claimed is:

1. A solution particularly for the pretreatment of a hydrophilic surface for hydrophobizing, comprising
   (i) a first silane having the formula

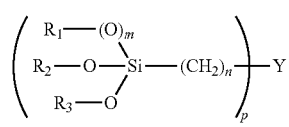

wherein $R^1$, $R^2$, $R^3$ independently of one another are selected from the group of methyl, ethyl, 2-methoxyethyl, propyl, isopropyl, butyl, benzyl, and m=0 or 1; n=3 to 12; p=1 or 2; and with the proviso that when p=1, then Y=a functional group selected from the group of (meth)acryloyl, (meth)acryloyloxy, mercapto, ureido, $-NH-CH_2-CH_2-NR^4R^5$, $-NR^4R^5$ (with $R^4$ and $R^5$ independently of one another selected from the group of H, alkyl, phenyl, benzyl, cycloalkyl), and when p=2, then Y=NH;

(ii) a second, aging stability enhancing silane having the formula

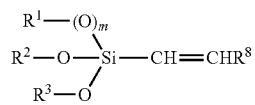

wherein $R^8$=H, alkyl, phenyl, benzyl or cycloalkyl; and (iii) a third silane having the formula $Si(OR^9)_4$ wherein $R^9$=methyl, ethyl, n-propyl, isopropyl, butyl, isobutyl, benzyl, phenyl.

2. The solution of claim 1, wherein the silanes are in solution in a nonprotic solvent or in a solvent mixture in which a nonprotic solvent is present at not less than 30% by weight.

3. The solution of claim 2 wherein the silanes in total are present in a concentration of 0.01% to 8% by weight in the solvent or solvent mixture.

4. The solution of claim 2 wherein the solvent is composed at least to an extent of 30% by weight of carboxylic esters.

5. The solution of claim 2 wherein the solvent possesses a boiling point between 35° C. and 180° C.

6. The solution of claim 1 wherein the ratio between the second silane and the third silane is 1:2 to 4:1.

7. The solution of claim 1 wherein the solution is present in the form of a pump spray or an aerosol.

8. The solution of claim 1 wherein the solution is dispensed into sealed-edge pouches containing a nonwoven or woven material or a sponge.

9. The solution of claim 1 wherein the solution is dispensed into containers containing a reservoir and an applicator and can be applied contactlessly.

10. The solution of claim 8 wherein the solution is located in a pack into which a nonwoven material or a sponge have been integrated such that they are located on the free surface of the pack, the solution separate from the nonwoven material or from the sponge as a result of a severable membrane, or which is enclosed by an envelope and in this way is separate from the nonwoven material or sponge.

* * * * *